(12) United States Patent
Oh et al.

(10) Patent No.: US 11,541,725 B2
(45) Date of Patent: Jan. 3, 2023

(54) THERMAL MANAGEMENT SYSTEM AND INTEGRATED THERMAL MANAGEMENT MODULE FOR VEHICLE

(71) Applicants: Hyundai Motor Company, Seoul (KR); Kia Motors Corporation, Seoul (KR)

(72) Inventors: Man Ju Oh, Yongin-Si (KR); So La Chung, Seoul (KR); Jae Woong Kim, Hwaseong-Si (KR); Sang Shin Lee, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 298 days.

(21) Appl. No.: 16/741,449

(22) Filed: Jan. 13, 2020

(65) Prior Publication Data
US 2021/0016632 A1    Jan. 21, 2021

(30) Foreign Application Priority Data
Jul. 16, 2019   (KR) .................... 10-2019-0085991

(51) Int. Cl.
*B60H 1/00* (2006.01)
*B60H 1/32* (2006.01)
*H01M 6/50* (2006.01)

(52) U.S. Cl.
CPC ..... *B60H 1/32281* (2019.05); *B60H 1/00278* (2013.01); *B60H 1/00392* (2013.01);
(Continued)

(58) Field of Classification Search
CPC ............ B60H 1/32281; B60H 1/00392; B60H 1/00278; B60H 2001/00078;
(Continued)

(56) References Cited

U.S. PATENT DOCUMENTS

2009/0152032 A1*  6/2009  Klotten .............. B60H 1/00535
                                                        180/68.4
2013/0053194 A1   2/2013  Yokoyama
(Continued)

FOREIGN PATENT DOCUMENTS

KR        10-1448656 B1    10/2014
KR     10-2018-0085958 A    7/2018
(Continued)

OTHER PUBLICATIONS

Balancing_of_rotating_masses—Wikipedia—2016 (Year: 2022).

*Primary Examiner* — Harry E Arant
(74) *Attorney, Agent, or Firm* — Morgan, Lewis & Bockius LLP

(57) ABSTRACT

A thermal management system for a vehicle may include a battery line connected to a high-voltage battery core, provided with a first radiator, and through which coolant is communicated by a first pump; an indoor heating line connected to a heating core for indoor air conditioning, provided with a hydrothermal heater therein, provided with a second pump to fluidically-communicate the coolant, and provided with a first valve at a downstream point of the heating core; a first and a second battery heating line branched or joined at the downstream point of the heating core in the indoor heating line to be connected to the upstream point and the downstream point of the high-voltage battery core, respectively; and a refrigerant line provided with an expansion valve, a cooling core for indoor air conditioning, a compressor, and a condenser.

14 Claims, 10 Drawing Sheets

(52) U.S. Cl.
CPC . *H01M 6/5038* (2013.01); *B60H 2001/00078* (2013.01); *B60H 2001/00928* (2013.01)

(58) Field of Classification Search
CPC ........... B60H 2001/00928; B60H 2001/00307; B60H 1/143; H01M 6/5038; H01M 10/663; H01M 10/613; H01M 10/6568; H01M 10/625; H01M 2220/20; Y02E 60/10

See application file for complete search history.

(56) References Cited

U.S. PATENT DOCUMENTS

| | | |
|---|---|---|
| 2013/0056194 A1 | 3/2013 | Cregut et al. |
| 2017/0008407 A1* | 1/2017 | Porras ................ B60H 1/00278 |
| 2018/0306472 A1 | 10/2018 | Molavi |
| 2019/0145719 A1 | 5/2019 | Meskin |
| 2020/0009939 A1* | 1/2020 | Potticary ............ B60H 1/00571 |
| 2020/0101816 A1* | 4/2020 | Takagi ............... B60H 1/00885 |
| 2020/0269724 A1 | 8/2020 | Takazawa et al. |
| 2020/0346523 A1 | 11/2020 | Oh et al. |
| 2020/0353796 A1 | 11/2020 | Oh et al. |
| 2020/0391570 A1 | 12/2020 | Lee et al. |

FOREIGN PATENT DOCUMENTS

| | | |
|---|---|---|
| KR | 10-2018-0099007 A | 9/2018 |
| KR | 10-2019-0033115 A | 3/2019 |

\* cited by examiner

THERMAL MANAGEMENT SYSTEM AND INTEGRATED THERMAL MANAGEMENT MODULE FOR VEHICLE

CROSS REFERENCE TO RELATED APPLICATION

The present application claims priority to Korean Patent Application No. 10-2019-0085991 filed on Jul. 16, 2019, the entire contents of which is incorporated herein for all purposes by this reference.

BACKGROUND OF THE PRESENT INVENTION

Field of the Invention

The present invention relates to a thermal management system for a vehicle, which efficiently manages energy required for indoor air conditioning or cooling of an electric component or cooling and heating of a battery in a vehicle thermal management field, and an integrated thermal management module for a vehicle configured as an assembly by integrating complicated coolant and refrigerant related components and lines.

Description of Related Art

Recently, an electric vehicle has emerged as a social issue to implement an eco-friendly technology and solve a problem such as energy depletion. The electric vehicle operates by use of a motor configured for receiving electricity from a battery to output power. Accordingly, the electric vehicle has no emission of carbon dioxide, has a very small noise, and has the energy efficiency of the motor higher than the energy efficiency of the engine, being spotlighted as an eco-friendly vehicle.

The core technology in implementing such an electric vehicle is a technology related to a battery module, and researches on lightweight, miniaturization, and short charging time of a battery have been actively conducted recently. The battery module may maintain optimum performance and long life only when it is used in the optimal temperature environment. However, it is difficult to use it in the optimal temperature environment due to heat generated during operation and a change in an external temperature.

Furthermore, since the electric vehicle requires warm-up to perform the vehicle indoor heating in winter as an electric heating apparatus, and to also enhance the battery charge and discharge performance during cold winter because of having no waste heat source generated at combustion in a separate engine like an internal combustion engine, the electric vehicle utilizes by forming a separate coolant heating electric heater, respectively.

That is, to maintain the optimal temperature environment of a battery module, a technology for operating a cooling and heating system for adjusting the temperature of the battery module separately from a cooling and heating system for vehicle indoor air conditioning is adopted. That is, two independent cooling and heating systems are built, one of which is used for indoor air conditioning and the other of which is used for adjusting the temperature of the battery module.

However, when operating in the above manner, energy is not managed efficiently, such that there occurs a more serious problem in winter heating, which did not matter in the internal combustion engine because a range is short so a long-distance operation is impossible, and the driving distance is reduced by 30% or more in summer cooling and 40% or more in winter heating. When the high capacity PTC is provided to solve the problem occurring in winter heating, there occurs a problem in that the cost and the weight are excessive due to the shortening of the driving distance and the use of a heat pump.

Furthermore, in the case of the electric vehicle, a cooling and heating circuit is somewhat complicated, and a plurality of valves, pumps, and other components are mounted thereon, such that a technology, which may effectively arrange and form them as an assembly, facilitating the installation in the vehicle, reducing the weight, and reducing the cost, is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for a vehicle, which may efficiently manage energy required for indoor air conditioning or cooling of an electric component or cooling and heating of a battery in a vehicle thermal management field, and an integrated thermal management module for a vehicle, which may be configured as an assembly by being mounted in a vehicle and integrating complicated coolant and refrigerant related components and lines, implementing a compact size and reducing the resistance of coolant or refrigerant to enhance the cooling and heating efficiency.

A thermal management system for a vehicle according to an exemplary embodiment of the present invention for achieving the object includes a battery line connected to a high-voltage battery core, provided with a first radiator, and through which coolant is communicated by a first pump; an indoor heating line connected to a heating core for indoor air conditioning, provided with a hydrothermal heater therein, provided with a second pump to fluidically-communicate the coolant, and provided with a first valve at a downstream point of the heating core; a first battery heating line and a second battery heating line branched or joined at the downstream point of the heating core in the indoor heating line to be connected to the upstream point and the downstream point of the high-voltage battery core, respectively, and to which at least any one of the point branched or the point jointed in the indoor heating line has been connected through the first valve of the indoor heating line; and a refrigerant line provided with an expansion valve, a cooling core for indoor air conditioning, a compressor, and a condenser.

The thermal management system for the vehicle may further include an electric component line connected to an electric component core, provided with a second radiator, and through which the coolant is communicated by a third pump.

The thermal management system for the vehicle may further include a controller for controlling the third pump to control so that the coolant is circulated in the electric component line, in the case of a first mode of cooling the electric component core by use of an outside air of the vehicle.

The thermal management system for the vehicle may further include a refrigerant bypass line having one end portion connected to the upstream point of the cooling core for indoor air conditioning in the refrigerant line, and having the other end portion connected between a downstream point of the cooling core for indoor air conditioning and an upstream point of the compressor in the refrigerant line; and a coolant bypass line having one end portion connected to the upstream point of the high-voltage battery core in the battery line, having the other end portion connected to the downstream point of the high-voltage battery core in the battery line, and having at least any one of one end portion or the other end portion connected through a second valve, and the refrigerant bypass line and the coolant bypass line may be connected to be heat-exchanged through a chiller.

The thermal management system for the vehicle may further include a controller for controlling the second valve and the first pump to control so that the coolant is circulated between the high-voltage battery core and the first radiator in the battery line, in the case of a second mode of cooling the high-voltage battery core by use of an outside air of the vehicle.

The thermal management system for the vehicle may further include a controller for controlling the compressor, the second valve and the first pump to control so that the refrigerant having passed through the compressor and the condenser passes through the chiller, and the coolant having passed through the high-voltage battery core flows into the chiller through the coolant bypass line to be heat-exchanged and then flowing into the high-voltage battery core again, in the case of a third mode of cooling the high-voltage battery core by use of the refrigerant line.

The thermal management system for the vehicle may further include a controller for controlling the hydrothermal heater, the first valve, and the second pump to control so that the coolant heated by the hydrothermal heater flows into the high-voltage battery core through the first battery heating line, and flows into the indoor heating line through the second battery heating line again, in the case of a fourth mode of heating the high-voltage battery core.

The thermal management system for the vehicle may further include a controller for controlling the first valve and the second pump to control so that the coolant having passed through the heating core flows into the high-voltage battery core through the first battery heating line, and flows into the indoor heating line through the second battery heating line again to be supplied to the heating core, in the case of a fifth mode of heating the indoor by use of the high-voltage battery core.

A thermal management system for a vehicle according to an exemplary embodiment of the present invention for achieving the object includes a battery line connected to a high-voltage battery core, and through which coolant is communicated by a first pump; a refrigerant line provided with an expansion valve, a cooling core for indoor air conditioning, a compressor, and a condenser; a refrigerant bypass line having one end portion connected to the upstream point of the cooling core for indoor air conditioning in the refrigerant line, and having the other end portion connected between a downstream point of the cooling core for indoor air conditioning and an upstream point of the compressor in the refrigerant line; and an electric component line connected to an electric component core, provided with a second radiator, and through which the coolant is communicated by a third pump, and the refrigerant bypass line is connected to be heat-exchanged through the battery line and a chiller at the downstream point of the high-voltage battery core.

An integrated thermal management module for a vehicle according to an exemplary embodiment of the present invention for achieving the object includes a chiller through which refrigerant and coolant flow, respectively, and connected so that the refrigerant and the coolant exchange heat with each other; a first reservoir portion that the coolant of an electric component line connected to an electric component core flows into and out and a second reservoir portion that the coolant of a battery line connected to a high-voltage battery core flows into and out; a first pump configured for circulating the coolant of the battery line; and a third pump configured for circulating the coolant of the electric component line.

The integrated thermal management module for the vehicle may further include a second valve for adjusting so that the coolant having passed through the chiller and the coolant of the second reservoir portion selectively flow into the high-voltage battery core by the first pump.

The second valve may be a three-way valve connected to the second reservoir portion, the chiller, and the first pump.

The second reservoir portion may have an inlet connected to a first radiator of the battery line, and have an outlet connected to the second valve.

The chiller may be formed with a coolant inlet into which the coolant flows and a coolant outlet out which the coolant flows, the coolant inlet may be connected to the high-voltage battery core of the battery line, and the coolant outlet may be connected to the second valve.

The chiller, the first reservoir portion, and the second reservoir portion may be directly or indirectly connected to each other to be formed as a single assembly.

The first reservoir portion and the second reservoir portion may be positioned to be spaced from each other and each internal space may form one reservoir tank communicating with each other on the upper portion thereof.

The chiller may be mounted adjacent to the side of the reservoir tank to be formed as a single assembly, and the assembly may be fastened to a vehicle body through a damper.

According to the thermal management system for the vehicle of the present invention, it is possible to efficiently manage energy required for the indoor air conditioning or the cooling of an electric component or the cooling and heating of the battery in the vehicle thermal management field.

Furthermore, according to the integrated thermal management module for the vehicle of the present invention, it may be configured as the assembly by being mounted in the vehicle and integrating the complicated coolant and refrigerant related components and lines, implementing the compact size and reducing the resistance of the coolant or the refrigerant to enhance the cooling and heating efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
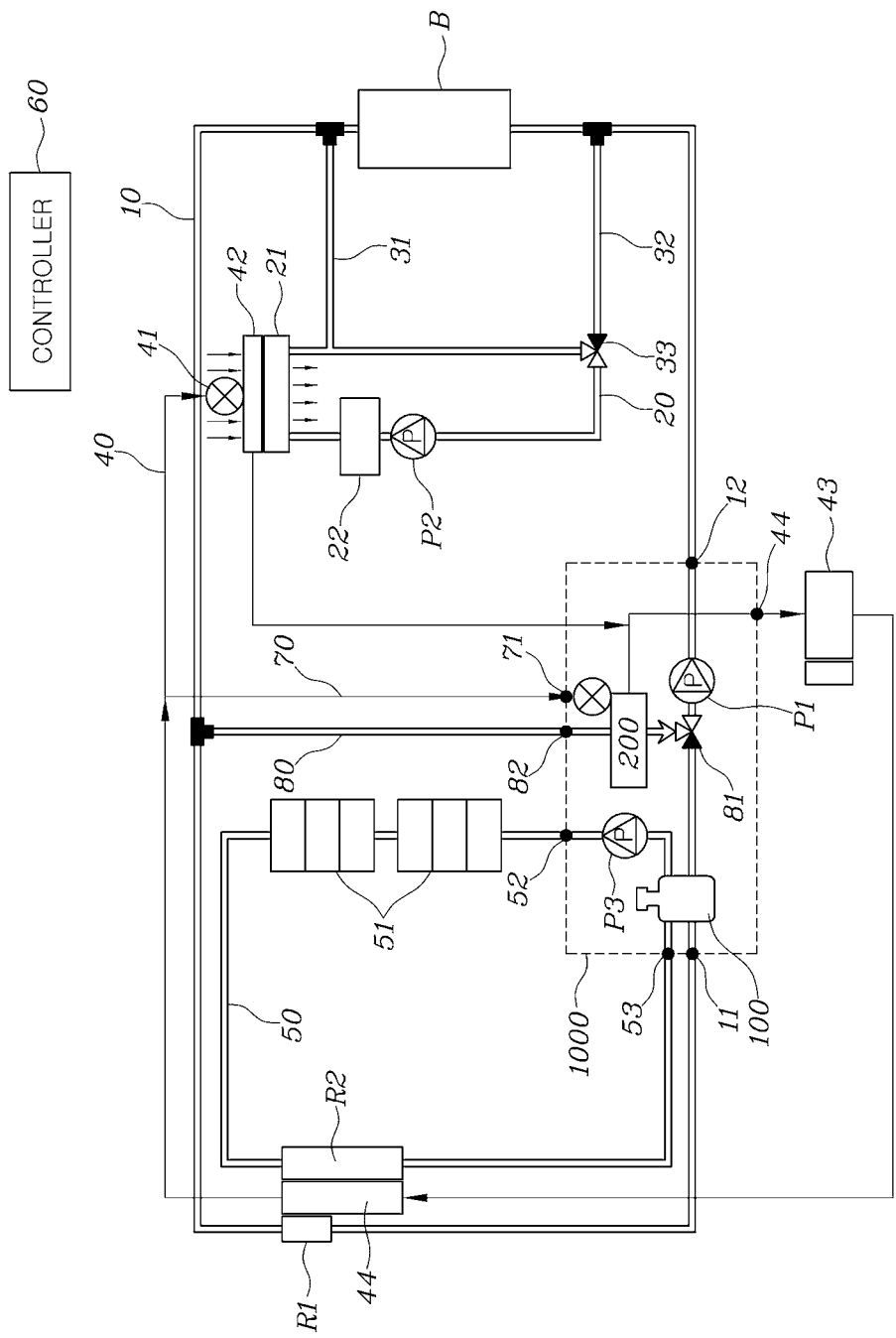
FIG. 1 is a diagram illustrating a configuration of a thermal management system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other h, and the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of the exemplary embodiments of the present invention included in the specification or application are only for illustrating the exemplary embodiments of the present invention, and the exemplary embodiments in accordance with various aspects of the present invention may be embodied in various forms and may not be construed as limited to the exemplary embodiments set forth in the specification or application.

Various modifications and various forms may be made in the exemplary embodiments according to an exemplary embodiment of the present invention, so that specific embodiments are illustrated in the drawings and described in detail in the specification or application. It may be understood, however, that it is not intended to limit the exemplary embodiments in accordance with the concepts of the present invention to the particular included forms, but includes all modifications, equivalents, and alternatives falling within the spirit and technical scope of the present invention.

The terms "first" and/or "second," and the like may be used to illustrate various components, but the components may not be limited by the terms. The terms are used to differentiate one element from another, for example, a first component may be referred to as a second component, and similarly, the second component may be also referred to as the first component without departing from claims in accordance with the concepts of the present invention.

It will be understood that when an element is referred to as being "connected" or "coupled" to another element, it may be "directly connected" or "coupled" to the other element, but also to the other element with other elements interposed therebetween. On the other h, and it may be understood that any configuration element has no other element in between the time stated that "directly connected" or "directly coupled" to another element. Other expressions that describe the relationship between elements, such as "between" and "directly between" or "adjacent to" and "directly adjacent to" may be interpreted as well.

The terminology used the specification is for describing various exemplary embodiments only and is not intended to limit the present invention. The singular forms are intended to include the plural forms as well, unless the context clearly indicates otherwise. In the specification, it will be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Unless otherwise defined, all terms including technical and scientific terms used herein have the same meaning as commonly understood by one of ordinary skill in the art to which an exemplary embodiment of the present invention belongs. It will be further understood that terms, such as those defined in commonly used dictionaries, should be additionally interpreted as having a meaning which is consistent with their meaning in the context of the relevant art, and will not be interpreted in an idealized or overly formal sense unless expressly so defined in the specification.

Hereinafter, the present invention will be described in detail by describing exemplary embodiments of the present invention with reference to the accompanying drawings. The same reference numerals indicated in each drawing denote the same members.

FIG. 1 is a diagram illustrating a configuration of a thermal management system for a vehicle according to an exemplary embodiment of the present invention.

Referring to FIG. 1, a thermal management system for a vehicle according to an exemplary embodiment of the present invention includes a battery line 10 connected to a high-voltage battery core (B), provided with a first radiator (R1), and through which coolant is communicated by a first pump (P1); an indoor heating line 20 connected to a heating core for indoor air conditioning 42, provided with a hydro-thermal heater 22 therein, provided with a second pump (P2) to communicate coolant, and provided with a first valve 33 at the downstream point of the heating core 21; a first battery heating line 31 and a second battery heating line 32 branched or joined at the downstream point of the heating core 21 in the indoor heating line 20 to be connected to the upstream point and the downstream point of the high-voltage battery core (B), respectively, and to which at least any one of the point branched or the point joined at the indoor heating line 20 is connected through the first valve 33 of the indoor heating line 20; and a refrigerant line 40 provided with an expansion valve 41, a cooling core for indoor air conditioning 42, a compressor 43, and a condenser 44.

The vehicle is mounted with various heat-generating mechanisms, such as electric components including a motor and an inverter, a high-voltage battery (B), and an indoor air conditioner for the vehicle. They need to be managed in the temperature sections different from each other, respectively, and since their operating points are different, a complicated circuit as in FIG. 1 is required to implement them independently.

The battery line 10 is connected to the high-voltage battery core (B). The first radiator (R1) is provided on the battery line 10, and the coolant may be circulated by the first pump (P1). The first radiator (R1) may be cooled by the outside air.

The battery line 10 includes a first pump (P1) which is controlled to be driven and stopped by a controller 60 to be described later, and the first pump (P1) circulates the coolant of the battery line 10 when driven.

The high-voltage battery core (B) may be a heat dissipation unit directly or indirectly connected to the high-voltage battery (B). As the coolant cooled by the outside air in the first radiator (R1) flows into the high-voltage battery core (B), the high-voltage battery (B) may be cooled.

The indoor heating line 20 is connected to the heating core for indoor air conditioning 42 to flow the coolant. The heating core for indoor air conditioning 42 exchanges heat with the air flowing into the interior of the vehicle.

Furthermore, the hydrothermal heater 22 may be provided in the indoor heating line 20. Furthermore, the coolant is circulated by the second pump (P2) on the indoor heating line 20. Accordingly, as the coolant heated by passing through the hydrothermal heater 22 passes through the heating core for indoor air conditioning 42, the air exchanging heat with the air flowing into the interior of the vehicle to be discharged into the interior of the vehicle is heated.

The first valve 33 may be provided at the downstream point of the heating core 21. The first battery heating line 31 or the second battery heating line 32 may be connected to the battery line 10 through the first valve 33.

The first battery heating line 31 is branched at the downstream point of the heating core 21 of the indoor heating line 20 to be connected to the upstream point of the high-voltage battery core (B) of the battery line 10. The second battery heating line 32 is branched at the downstream point of the high-voltage battery core (B) to be joined at the downstream point of the heating core 21 of the indoor heating line 20. That is, the coolant having passed through the heating core 21 may flow into the battery line 10 at the upstream point of the high-voltage battery core (B) through the first battery heating line 31, then pass through the high-voltage battery core (B), and may be again joined to the indoor heating line 20 at the downstream point of the high-voltage battery core (B) through the second battery heating line 32.

At least any one of the point branched or the point jointed in the indoor heating line 20 may be connected through the first valve 33 of the indoor heating line 20. That is, the point branched to the first battery heating line 31 from the indoor heating line 20 or the point at which the second battery heating line 32 is joined to the indoor heating line 20 may be connected through the first valve 33 which is a three-way valve.

When the first valve 33 is a four-way valve, both the first battery heating line 31 and the second battery heating line 32 may be connected through the first valve 33.

The refrigerant line 40 may be provided with the expansion valve 41, the cooling core for indoor air conditioning 42, the compressor 43, and the condenser 44. The condenser 44 may heat-dissipate the refrigerant by use of the outside air of the vehicle by air cooling. The compressor 43 may be driven or stopped by the controller 60 to compress the refrigerant to high temperature and high pressure. The refrigerant may be expanded by the expansion valve 41 to exchange heat with the air flowing into the interior of the vehicle passing through the cooling core for indoor air conditioning 42, cooling the air flowing into the indoor.

Furthermore, the present invention may further include an electric component line 50 connected to an electric component core 51, provided with the second radiator (R2), and through which coolant is communicated by the third pump (P3).

The electric component core 51 may also be a heat dissipation unit directly connected to an electric component, etc., and is a concept all including a heat dissipation unit indirectly connected to the electric component, etc. through a separate coolant line.

The second radiator (R2) provided in the electric component line 50 may be cooled by exchanging heat with the outside air of the vehicle, and the refrigerant cooled by passing through the second radiator (R2) is circulated to the electric component core 51, cooling the electric component core 51.

The present invention may further include a refrigerant bypass line 70 having one end portion connected to the upstream point of the cooling core for indoor air conditioning in the refrigerant line 40, and having the other end portion connected between the downstream point of the cooling core 42 for indoor air conditioning and the upstream point of the compressor 43 in the refrigerant line 40; and a coolant bypass line 80 having one end portion connected to the upstream point of the high-voltage battery core (B) in the battery line 10, having the other end portion connected to the downstream point of the high-voltage battery core (B) in the battery line 10, and having at least any one of one end portion or the other end portion connected through a second valve 81, and the refrigerant bypass line 70 and the coolant bypass line 80 may be connected to be heat-exchanged through a chiller 200.

The refrigerant bypass line 70 may be connected to the upstream point of the compressor 43 by bypassing the cooling core 42 for indoor air conditioning at the upstream point of the cooling core for indoor air conditioning 42.

The coolant bypass line 80 may be branched at the downstream point of the high-voltage battery core (B) to bypass the first radiator (R1) to be connected to the upstream point of the high-voltage battery core (B). The coolant bypass line 80 may pass through the chiller 200.

The second valve 81 may be positioned at the point branched or joined from the battery line 10 to the coolant bypass line 80. As illustrated, the second valve 81 may be positioned at the point joined from the coolant bypass line 80 to the battery line 10, and connected to a three-way valve. The first pump (P1) may be positioned at the downstream of the point where the coolant bypass line 80 has been joined to the battery line 10 in the second valve 81.

The refrigerant bypass line 70 and the coolant bypass line 80 may be connected to exchange heat with each other in the chiller 200.

FIGS. 2 to 6 are diagrams illustrating a configuration of circulating the coolant and the refrigerant of the thermal management system for the vehicle according to an exemplary embodiment of the present invention.

Referring further to FIGS. 2 to 6, the controller 60 may control driving of the first pump (P1), the second pump (P2), the third pump (P3), and the compressor 43. Furthermore, the controller 60 may control the opening and closing of the first valve 33 and the second valve 81 to selectively connect the coolant and or to control the flow rate of the coolant.

The controller 60 according to an exemplary embodiment of the present invention is a nonvolatile memory configured to store data relating to an algorithm configured to control an operation of various components of the vehicle or a software instruction for reproducing the algorithm and a processor configured to perform an operation to be described below by use of the data stored in the corresponding memory. Here, the memory and the processor may be implemented as separate chips. Alternatively, the memory and the processor may be implemented as a single chip integrated with each other. The processor may take the form of one or more processors.

Figure 2:
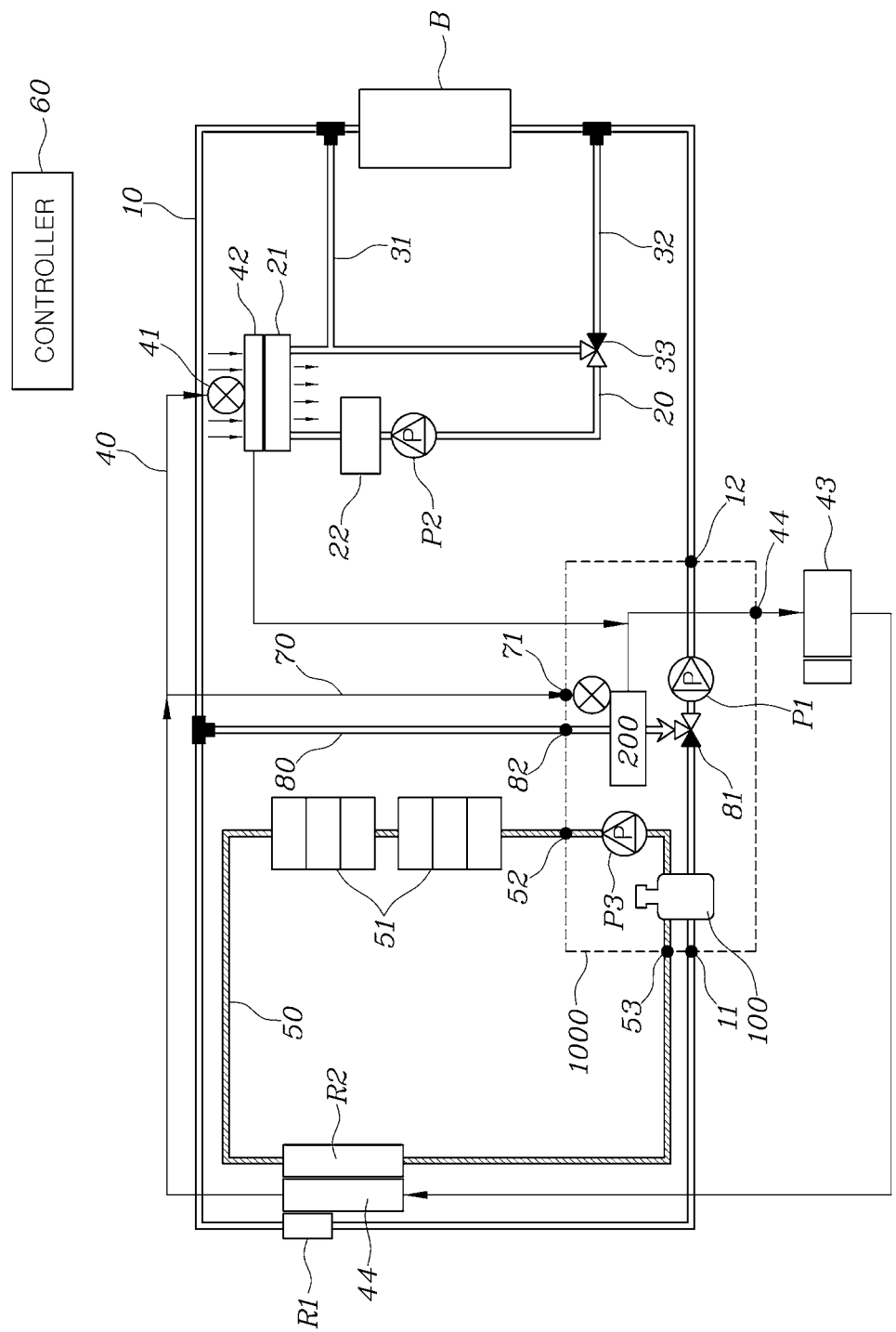
FIG. 2, FIG. 3, FIG. 4, FIG. 5 and FIG. 6 are diagrams illustrating configurations of circulating coolant and refrigerant of the thermal management system for the vehicle according to an exemplary embodiment of the present invention.

Referring to FIG. 2, in the case of a first mode of cooling the electric component core 51 by use of the outside air of the vehicle, the controller 60 may control the third pump (P3) to control so that the coolant is circulated in the electric component line 50.

The controller 60 may cool the coolant heated by passing through the electric component core 51 by the outside air of the vehicle in the second radiator (R2) and then circulate the coolant by driving the third pump (P3) to flow into the electric component core 51 again.

Figure 3:
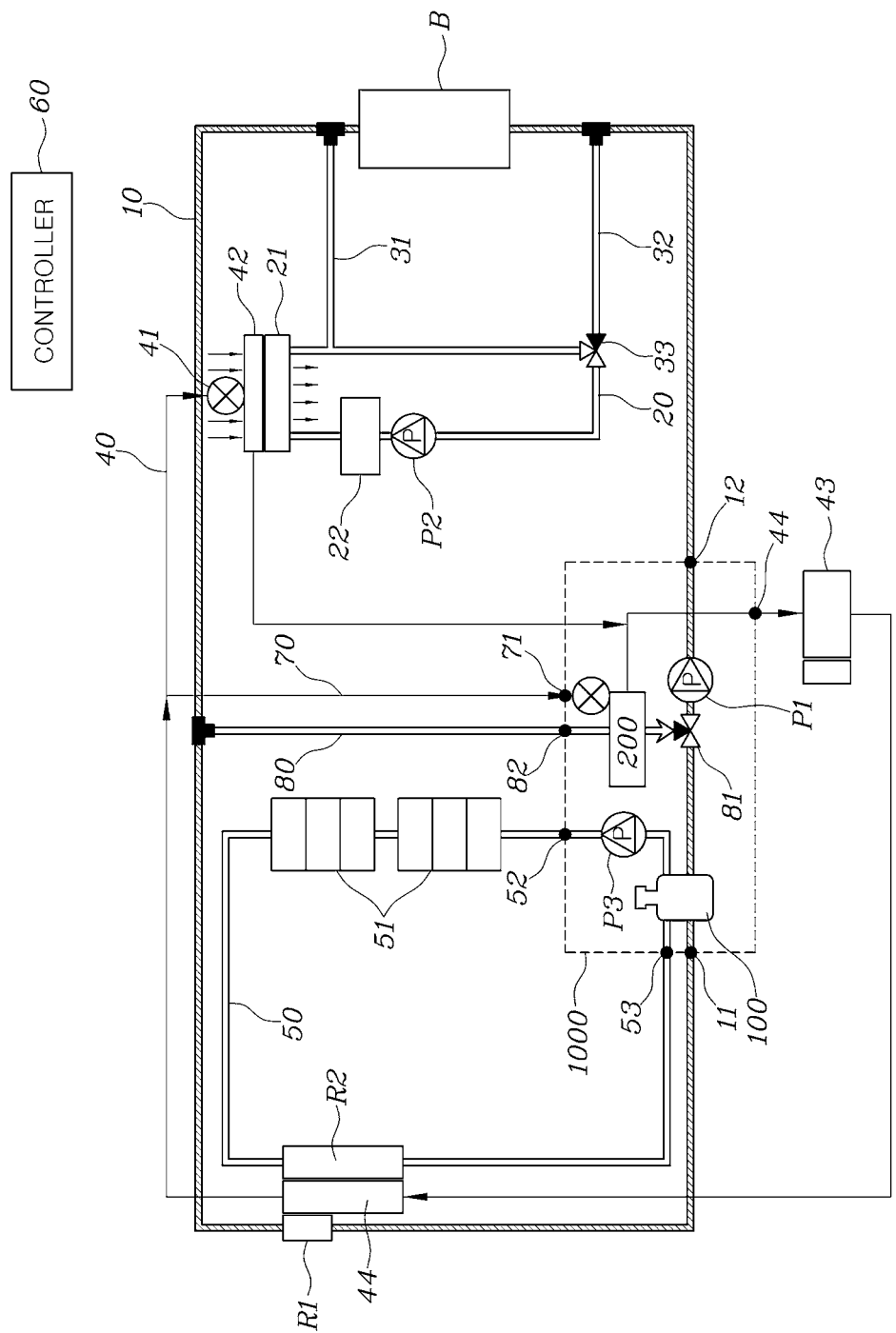

Referring to FIG. 3, in the case of a second mode of cooling the high-voltage battery core (B) by use of the outside air of the vehicle, the controller 60 may control the second valve 81 and the first pump (P1) to control so that the coolant is circulated between the high-voltage battery core (B) and the first radiator (R1).

The controller 60 may cool the coolant heated by passing through the high-voltage battery core (B) through the first radiator (R1) cooled by the outside air of the vehicle and then drive the first pump (P1) to flow into the high-voltage battery core (B) again, and may control the opening and closing of the second valve 81.

Figure 4:
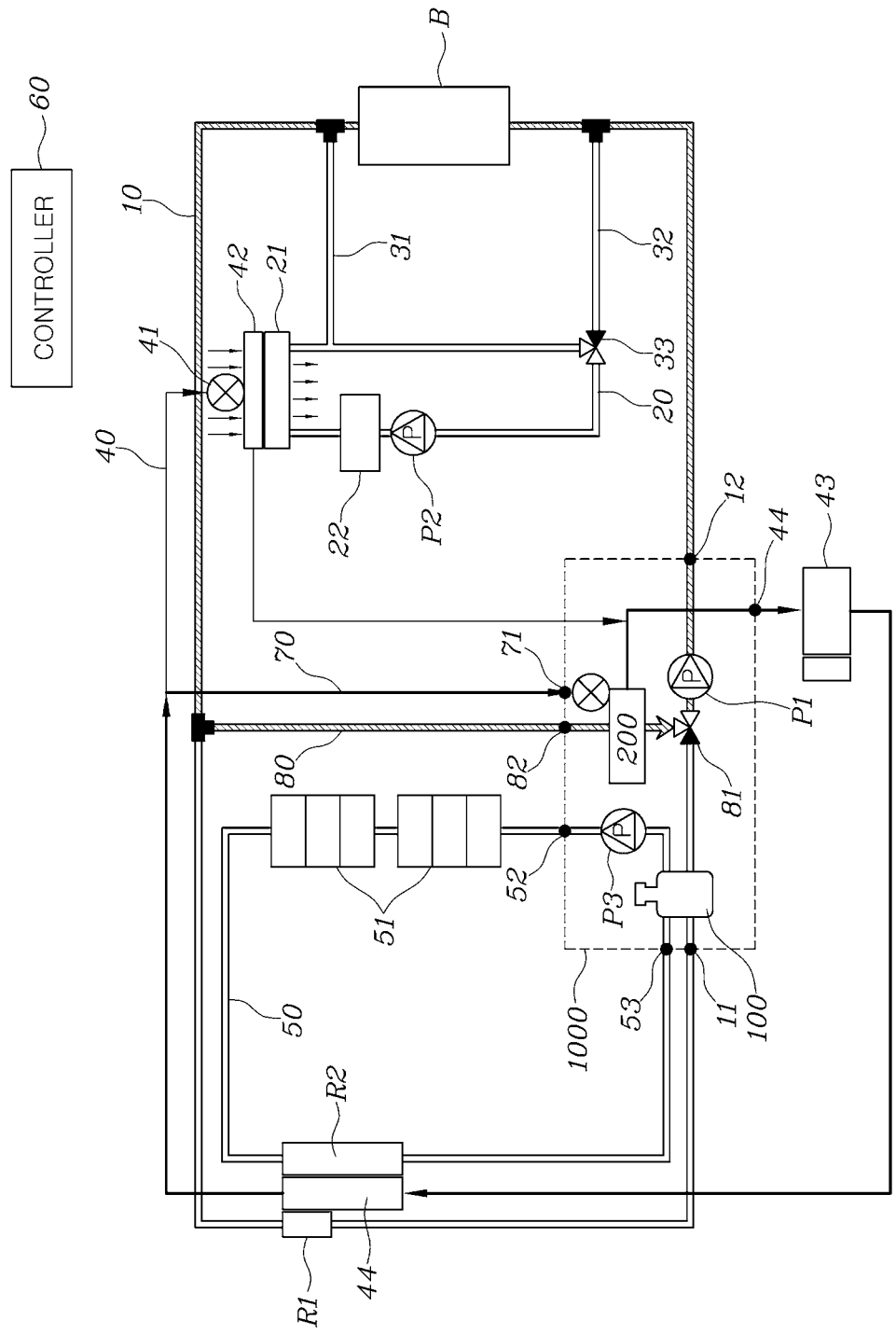

Referring to FIG. 4, in the case of a third mode of cooling the high-voltage battery core (B) by use of the refrigerant line 40, the controller 60 may control the compressor 43, the second valve 81, and the first pump (P1) to control so that the refrigerant having passed through the compressor 43 and the condenser 44 passes through the chiller 200, and the coolant having passed through the high-voltage battery core (B) flows into the chiller through the coolant bypass line 80 to be heat-exchanged and then flows into the high-voltage battery core (B) again.

The controller 60 may control the first pump (P1) and the second valve 81 so that the coolant heated by passing through the high-voltage battery core (B) is cooled through the chiller 200 and flows into the high-voltage battery core (B) again by passing through the chiller 200 through the coolant bypass line 80.

Furthermore, the controller 60 may drive the compressor 43 to flow the high temperature and high pressure refrigerant to the condenser 44 to cool it and then to flow into the chiller 200 through the refrigerant bypass line 70 to cool the coolant in the chiller 200 by use of the refrigerant.

Figure 5:
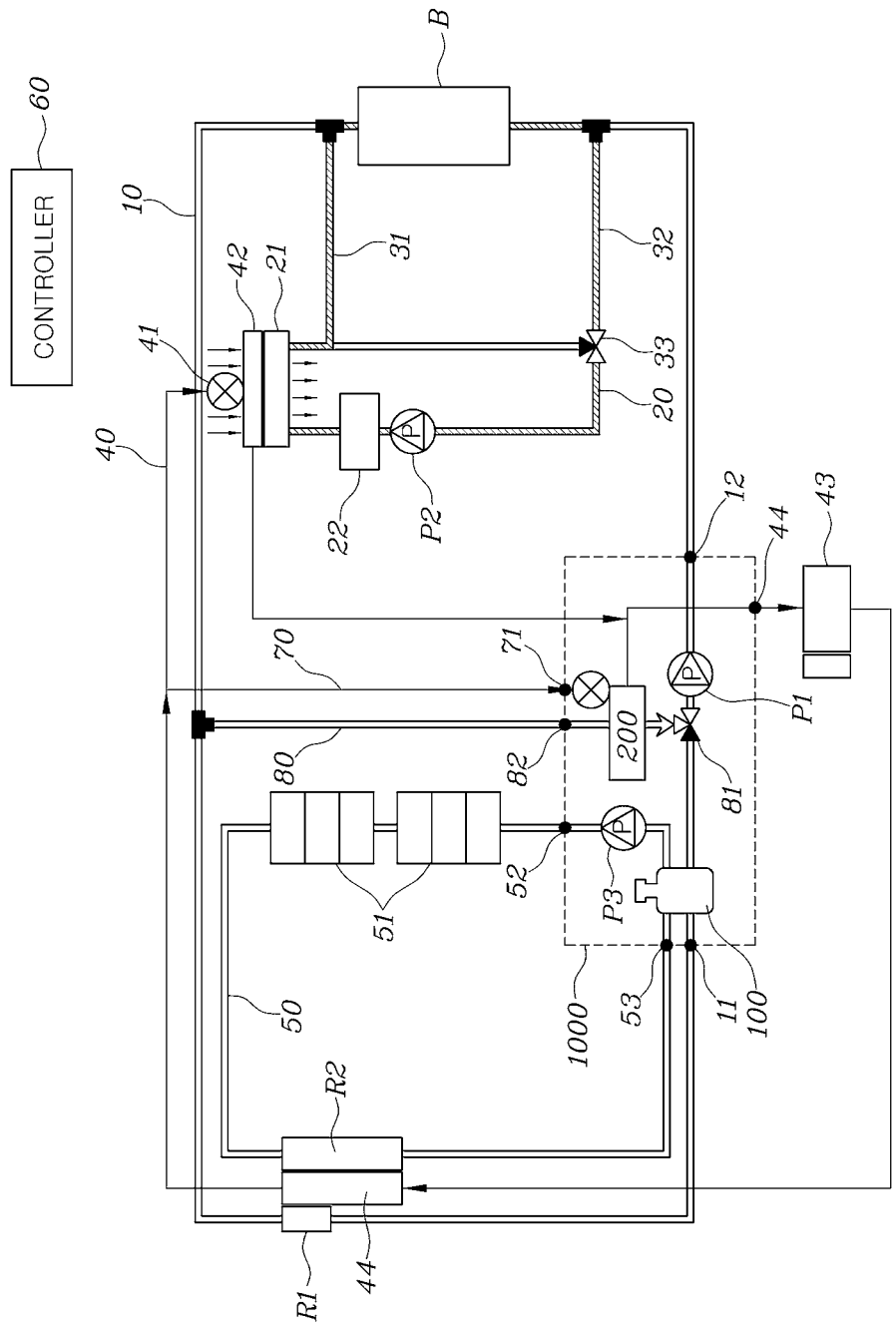

Referring to FIG. 5, in the case of a fourth mode of heating the high-voltage battery core (B), the controller 60 may control the hydrothermal heater 22, the first valve 33, and the second pump (P2) to control so that the coolant heated by the hydrothermal heater 22 flows into the high-voltage battery core (B) through the first battery heating line 31, and flows into the indoor heating line 20 through the second battery heating line 32 again.

When it is necessary to increase the temperature of the high-voltage battery (B) as in the cold-start, the controller 60 may heat the coolant of the indoor heating line 20 by use of the hydrothermal heater 22.

Furthermore, the controller 60 may control to drive the second pump (P2), and control the opening and closing of the first valve 33 so that the coolant of the indoor heating line 20 is circulated to the first battery heating line 31 and the second battery heating line 32.

Continuously referring to FIG. 5, in the case of a fifth mode of heating the indoor by use of the high-voltage battery core (B), the controller 60 may control the first valve 33 and the second pump (P2) to control so that the coolant having passed through the heating core 21 flows into the high-voltage battery core (B) through the first battery heating line 31, and flows into the indoor heating line 20 through the second battery heating line 32 to be supplied to the heating core 21 again.

When the indoor heating is required as in winter, and overheating is generated or sufficient heat is generated in the high-voltage battery (B), the controller 60 may control the opening and closing of the first valve 33 so that the coolant of the indoor heating line 20 is circulated to the first battery heating line 31 and the second battery heating line 32. The controller 60 may heat the coolant of the indoor heating line 20 by use of the heat generated from the high-voltage battery (B) while not operating or operating the hydrothermal heater 22 relatively little.

Figure 6:
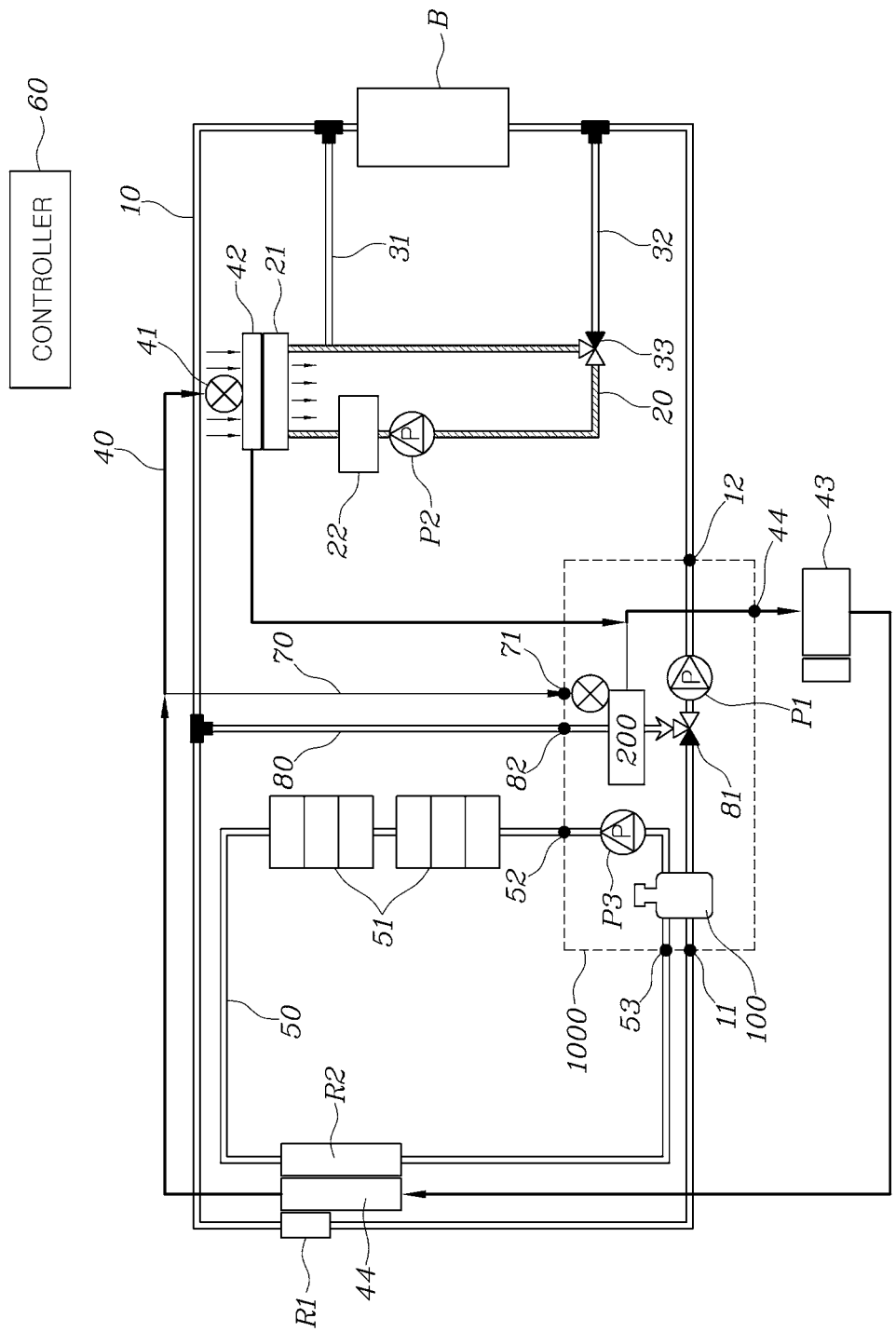

Referring to FIG. 6, in the case of a sixth mode of heating the indoor by the hydrothermal heater 22 while cooling the indoor by use of the refrigerant line 40, the controller 60 may cool the cooling core 42 for indoor air conditioning as the refrigerant is evaporated by driving the compressor 43, drive the second pump (P2) while operating the hydrothermal heater 22 of the indoor heating line 20, and control the first valve 33 so that the coolant of the indoor heating line 20 does not flow into the first battery heating line 31 and the second battery heating line 32.

Accordingly, a dehumidification mode in which the absolute humidity of the air flowing into the interior of the vehicle reduces and then the relative humidity thereof increases due to the temperature rise to discharge the dry air into the indoor may be implemented.

Furthermore, in a seventh mode of cooling the indoor, the controller 60 may drive the compressor 43 to control to cool the cooling core 42 for indoor air conditioning by use of the refrigerant, and in an eighth mode of heating the indoor, the controller 60 may control the hydrothermal heater 22, the second pump (P2), and the first valve 33 of the indoor heating line 20 to control so that the coolant of the indoor heating line 20 heated by the hydrothermal heater 22 does not flow into the first battery heating line 31 and the second battery heating line 32 and is circulated to the heating core for indoor air conditioning 42.

Figure 7:
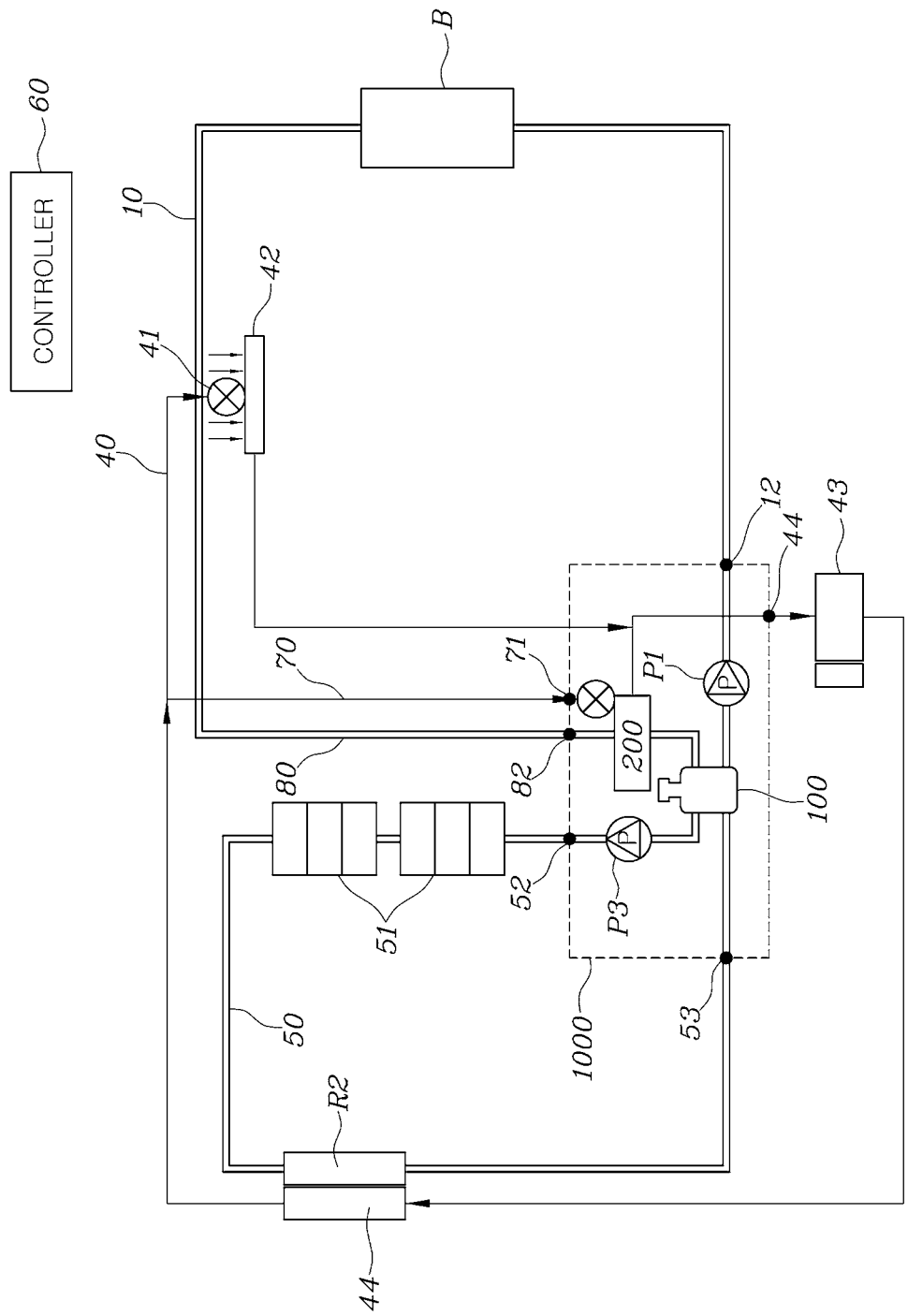
FIG. 7 is a diagram illustrating a configuration of a thermal management system for a vehicle according to various exemplary embodiments of the present invention.

FIG. 7 is a diagram illustrating a configuration of a thermal management system for a vehicle according to various exemplary embodiments of the present invention.

Referring to FIG. 7, a thermal management system for a vehicle according to various exemplary embodiments of the present invention includes the battery line 10 connected to the high-voltage battery core (B), and through which coolant is communicated by the first pump (P1); the refrigerant line 40 provided with the expansion valve 41, the cooling core for indoor air conditioning 42, the compressor 43, and the condenser 44; the refrigerant bypass line 70 having one end portion connected to the upstream point of the cooling core 42 for indoor air conditioning in the refrigerant line 40 and having the other end portion connected between the downstream point of the cooling core 42 for indoor air conditioning and the upstream point of the compressor 43 in the refrigerant line 40; and the electric component line 50 connected to the electric component core 51, provided with the second radiator (R2), and through which the coolant is communicated by the third pump (P3), and the refrigerant bypass line 70 is connected to be heat-exchanged through the battery line 10 and the chiller 200 at the downstream point of the high-voltage battery core (B).

The thermal management system for the vehicle according to various exemplary embodiments of the present invention may be applied to a case where the heating core for indoor air conditioning 42 is unnecessary because the temperature is kept high as in the tropics and the indoor heating is not required.

Accordingly, in the heat management system for the vehicle according to various exemplary embodiments of the present invention, the indoor heating line 20 including the hydrothermal heater 22 and the heating core 21 may be removed.

Furthermore, in the instant case, the first radiator (R1) of the battery line 10 may be removed, and the battery line 10 may be cooled by exchanging heat with the refrigerant bypass line 70 in the chiller 200. The refrigerant bypass line 70 may exchange heat with the battery line 10 while passing through the chiller 200.

Figure 8:
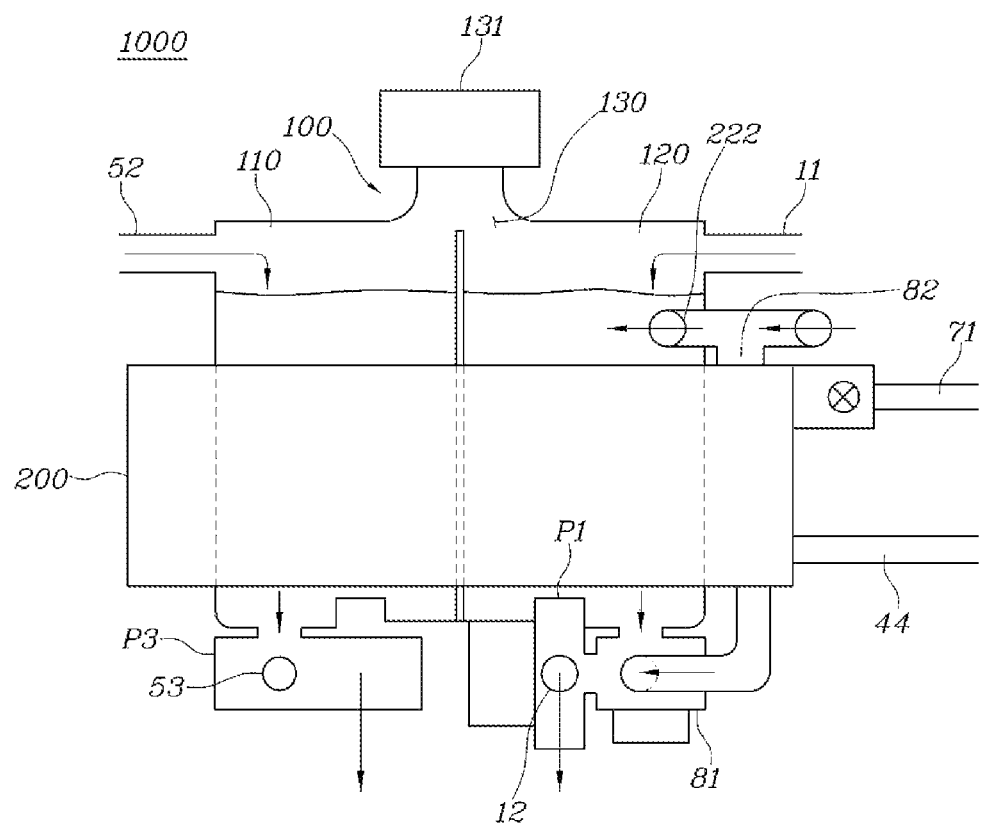
FIG. 8 is a diagram illustrating a configuration of an integrated thermal management module for a vehicle according to an exemplary embodiment of the present invention.
Figure 9:
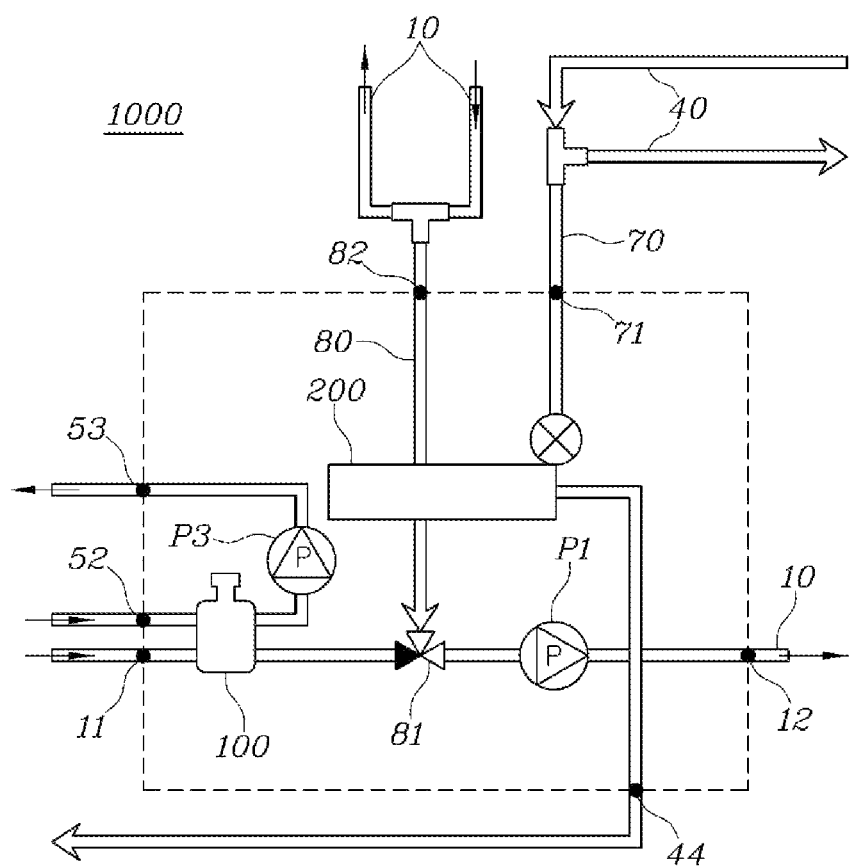
FIG. 9 is a circuit diagram illustrating the integrated thermal management module of FIG. 8.

FIG. 8 is a diagram illustrating a configuration of the integrated thermal management module 1000 for the vehicle according to an exemplary embodiment of the present invention, and FIG. 9 is a circuit diagram illustrating the integrated thermal management module 1000 of FIG. 8.

Referring to FIG. 8 and FIG. 9, the integrated thermal management module 1000 for the vehicle according to an exemplary embodiment of the present invention includes the chiller 200 connected so that refrigerant and coolant flow into and out, respectively, and the refrigerant and the coolant are heat-exchanged therebetween; a first reservoir portion 110 that the coolant of the electric component line 50 connected to the electric component core 51 flows into and out and a second reservoir portion 120 that the coolant of the battery line 10 connected to the high-voltage battery core (B) flows into and out; the first pump (P1) for circulating the coolant of the battery line 10; and the third pump (P3) for circulating the coolant of the electric component line 50.

The integrated thermal management module 1000 for the vehicle according to an exemplary embodiment of the present invention may be a thermal management module applied to the thermal management system for the vehicle according to an exemplary embodiment of the present invention illustrated in FIGS. 1 to 7.

The chiller 200 is a configuration that the refrigerant and the coolant separately flow into and out, respectively, and may be connected so that the refrigerant and the coolant are heated or cooled through the heat exchange with each other.

The first reservoir portion 110 may be connected to the electric component line 50 (52, 53), and the coolant of the electric component line 50 may flow into and out. The second reservoir portion 120 may be connected to the battery line 10 (11, 12), and the coolant of the battery line 10 may flow into and out. The first reservoir portion 110 and the second reservoir portion 120 is configured to maintain a state where the coolant has been stored and to remove bubbles which may be generated while being flowed in the coolant line.

The present invention may further include the second valve 81 for adjusting so that the coolant having passed through the chiller 200 and the coolant of the second reservoir portion 120 selectively flow into the high-voltage battery core (B) by the first pump (P1).

The second valve 81 may determine the flow direction or adjust the flow rate between the coolant having passed through the second reservoir portion 120 and the coolant having passed through the chiller 200 after being cooled in the first radiator (R1). The coolant having passed through the second valve 81 may flow into the first pump (P1) to circulate the battery line 10.

The second valve 81 may be a three-way valve connected to the second reservoir portion 120, the chiller 200, and the first pump (P1). The second valve 81 positioned in the battery line 10 may be connected to the outlet of the second reservoir portion 120 and the outlet of the chiller 200, respectively, and may be connected to the inlet of the first pump (P1).

The first reservoir portion 110 may have an inlet connected to the second radiator (R2) of the electric component line 50 (52), and have an outlet connected to the third pump (P3) (53).

The second reservoir portion 120 may have an inlet connected to the first radiator (R1) of the battery line 10 (11), and have an outlet connected to the second valve 81 (12).

The chiller 200 may be formed with a coolant inlet into which coolant flows and a coolant outlet out which coolant flows, and the coolant inlet may be connected to the high-voltage battery core (B) of the battery line 10 (82), and the coolant outlet may be connected to the second valve 81.

The chiller 200 may be separately formed with a refrigerant inlet and a refrigerant outlet while being formed with a coolant inlet and a coolant outlet. The coolant inlet may be connected to the coolant bypass line 80 branched at the downstream point of the high-voltage battery core (B) of the battery line 10 (81). That is, the coolant heated in the high-voltage battery core (B) may flow into the chiller 200. The coolant cooled in the chiller 200 may be discharged to the second valve 81.

The refrigerant inlet of the chiller 200 may be connected to the condenser 44 so that the refrigerant condensed in the condenser 44 may flow into (71), and the refrigerant may cool the coolant while being expanded in the chiller 200. The refrigerant outlet may be connected to the compressor 43 (44) to be compressed again at high temperature and high pressure.

That is, the second valve 81 may be connected to the outlet of the second reservoir portion 120 and the outlet of the chiller 200, respectively.

Figure 10:
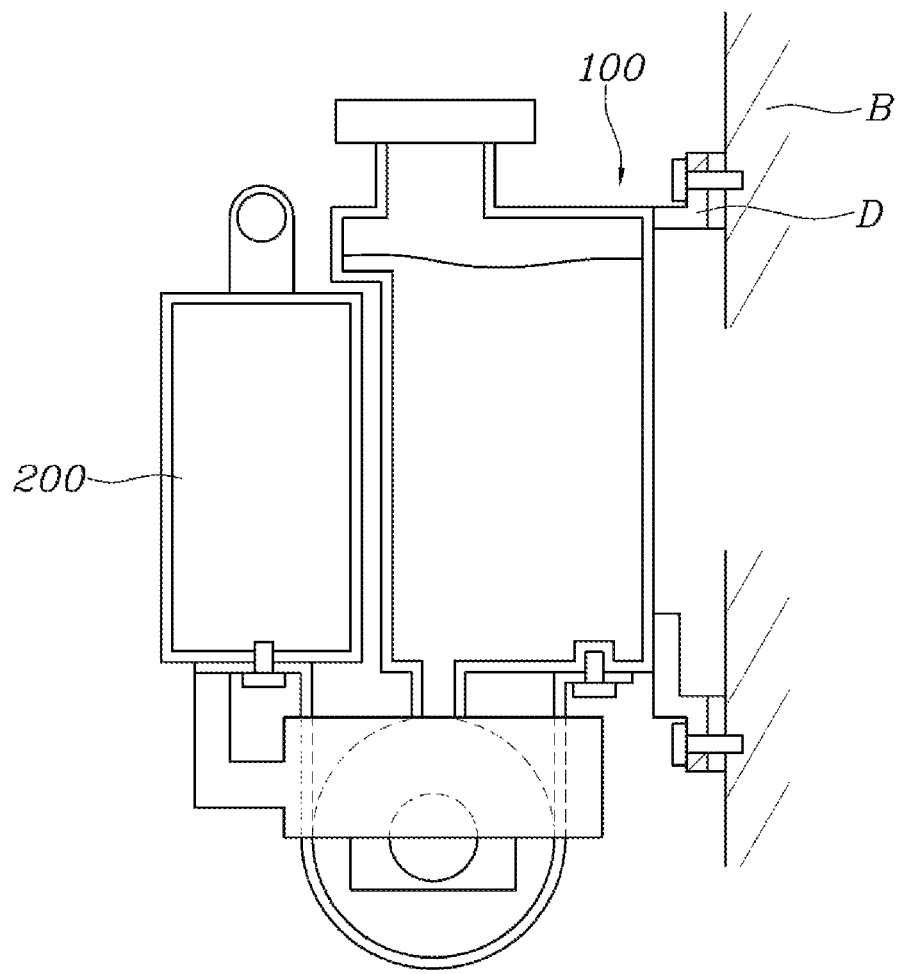
FIG. 10 is a diagram illustrating a state where the integrated thermal management module of FIG. 8 has been coupled to a vehicle body.

FIG. 10 is a diagram illustrating a state where the integrated thermal management module 1000 of FIG. 8 has been coupled to a vehicle body (B).

Further referring to FIG. 10, the chiller 200, the first reservoir portion 110, and the second reservoir portion 120 may be directly or indirectly connected to each other to be formed as a single assembly.

As described below, the first reservoir portion 110 and the second reservoir portion 120 may be integrally formed in one configuration, and the chiller 200 may form an integrated assembly directly or indirectly connected to a reservoir tank 100.

The chiller 200 is mounted to be adjacent to the side of the reservoir tank 100 to be formed as a single assembly, and the assembly may be fastened to the vehicle body (B) through a damper (D). The first pump (P1) and the third pump (P3) may also be configured together in the assembly. Since the reservoir tank 100 and the chiller 200 are configurations that include the coolant therein to have a large mass, it is possible to absorb the vibration generated in the first pump (P1) and the third pump (P3), and to be connected to the vehicle body (B) through the damper (D), minimizing the vibration transferred to the vehicle body (B).

Furthermore, the first pump (P1) and the third pump (P3) may be positioned on the bottom surface of the reservoir tank 100, and the rotation shafts of the pump may be mounted to cross each other. Accordingly, it is possible to change the direction of the vibration of each pump, and accordingly, to prevent the phenomenon that the vibration of the pump is excited.

The first reservoir portion 110 and the second reservoir portion 120 may be positioned to be spaced from each other, and each internal space may form one reservoir tank 100 communicating with each other on the upper portion thereof.

The reservoir tank 100 may be divided into the first reservoir portion 110 and the second reservoir portion 120. In the case of the electric component and the high-voltage battery (B), because the management temperatures are different from each other, the internal space of the reservoir tank 100 is divided into two separate spaces.

The upper portion 130 of the reservoir tank 100 may be formed with an empty space to remove bubbles generated from the coolant of the first reservoir portion 110 and the second reservoir portion 120, and they may be communicating with each other.

The reservoir tank 100 may be supplemented with a coolant through one injection inlet 131, and if there is a shortage, the reservoir tank 100 may be partially exchanged with each other so that there is no problem in performance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the system comprising:
    a battery line connected to a battery core, mounted with a first radiator, and through which coolant is fluidically-communicated by a first pump;
    an indoor heating line connected to a heating core for indoor air conditioning, mounted with a hydrothermal heater therein, mounted with a second pump to fluidically-communicate the coolant, and mounted with a first valve at a downstream point of the heating core;
    a first battery heating line and a second battery heating line branched or joined at the downstream point of the heating core in the indoor heating line to be connected to an upstream point and a downstream point of the battery core in the battery line, respectively, and to which at least one of a point branched or a point jointed in the indoor heating line has been connected through the first valve of the indoor heating line;
    a refrigerant line mounted with an expansion valve, a cooling core for indoor air conditioning, a compressor, and a condenser; and
    an electric component line connected to an electric component core, mounted with a second radiator, and through which the coolant is fluidically-communicated by a third pump,
    wherein the system further comprises an integrated thermal management module for the vehicle, the integrated thermal management module comprising:
        a chiller through which refrigerant and coolant flow, respectively, and connected so that the refrigerant and the coolant exchange heat with each other; and
        a first reservoir portion though which the coolant of the electric component line connected to the electric component core flows and a second reservoir portion through which the coolant of a battery line connected to a battery core flows,
    wherein the first reservoir portion has an inlet connected to the second radiator of the electric component line and an outlet directly connected to the third pump,
    wherein the first reservoir portion and the second reservoir portion are positioned to be spaced from each other and each internal space thereof forms a reservoir tank fluidically-communicating with each other on an upper portion thereof,
    wherein the first pump and the third pump are positioned on a bottom surface of the reservoir tank, and
    wherein rotation shafts of the first pump and the third pump are mounted to cross each other.

2. The thermal management system for the vehicle according to claim 1, further including a controller configured for controlling the third pump to control so that the coolant is circulated in the electric component line, in a first mode for cooling the electric component core by use of an outside air of the vehicle.

3. The thermal management system for the vehicle according to claim 1, further including:
    a refrigerant bypass line having a first end portion connected to an upstream point of the cooling core for indoor air conditioning in the refrigerant line, and having a second end portion connected between a downstream point of the cooling core for indoor air conditioning and an upstream point of the compressor in the refrigerant line; and
    a coolant bypass line having a first end portion connected to the upstream point of the battery core in the battery line, having a second end portion connected to the downstream point of the battery core in the battery line, and having at least one of the first end portion or the second end portion of the coolant bypass line connected through a second valve,
    wherein the refrigerant bypass line and the coolant bypass line are connected to be heat-exchanged through the chiller.

4. The thermal management system for the vehicle according to claim 3, further including a controller configured for controlling the second valve and the first pump to control so that the coolant is circulated between the battery core and the first radiator in the battery line, in a second mode for cooling the battery core by use of an outside air of the vehicle.

5. The thermal management system for the vehicle according to claim 3, further including a controller configured for controlling the compressor, the second valve and the first pump to control so that the refrigerant having passed through the compressor and the condenser passes through the chiller, and the coolant having passed through the battery core flows into the chiller through the coolant bypass line to be heat-exchanged and then flowing into the battery core again, in a third mode for cooling the battery core by use of the refrigerant line.

6. The thermal management system for the vehicle according to claim 1, further including a controller configured for controlling the hydrothermal heater, the first valve, and the second pump to control so that the coolant heated by the hydrothermal heater flows into the battery core through the first battery heating line, and flows into the indoor heating line through the second battery heating line again, in a fourth mode for heating the battery core.

7. The thermal management system for the vehicle according to claim 1, further including a controller configured for controlling the first valve and the second pump to control so that the coolant having passed through the heating core flows into the battery core through the first battery heating line, and flows into the indoor heating line through the second battery heating line again to be supplied to the heating core, in a fifth mode for heating the indoor by use of the battery core.

8. A thermal management system for a vehicle, the system comprising:
   a battery line connected to a battery core, and through which coolant is fluidically-communicated by a first pump;
   a refrigerant line mounted with an expansion valve, a cooling core for indoor air conditioning, a compressor, and a condenser;
   a refrigerant bypass line having a first end portion connected to an upstream point of the cooling core for indoor air conditioning in the refrigerant line, and having a second end portion connected between a downstream point of the cooling core for indoor air conditioning and an upstream point of the compressor in the refrigerant line; and
   an electric component line connected to an electric component core, mounted with a second radiator, and through which the coolant is fluidically-communicated by a third pump,
   wherein the refrigerant bypass line is connected to be heat-exchanged through the battery line and a chiller at a downstream point of the battery core,
   wherein the system further comprises an integrated thermal management module for the vehicle, the integrated thermal management module comprising:
      the chiller through which refrigerant and coolant flow, respectively, and connected so that the refrigerant and the coolant exchange heat with each other; and
      a first reservoir portion though which the coolant of the electric component line connected to an electric component core flows and a second reservoir portion through which the coolant of a battery line connected to a battery core flows;
   wherein the first reservoir portion has an inlet connected to the second radiator of the electric component line and an outlet directly connected to the third pump,
   wherein the first reservoir portion and the second reservoir portion are positioned to be spaced from each other and each internal space thereof forms a reservoir tank fluidically-communicating with each other on an upper portion thereof,
   wherein the first pump and the third pump are positioned on a bottom surface of the reservoir tank, and
   wherein rotation shafts of the first pump and the third pump are mounted to cross each other.

9. The integrated thermal management module for the vehicle according to claim 8, further including a valve for adjusting so that the coolant having passed through the chiller and the coolant of the second reservoir portion selectively flow into the battery core by the first pump.

10. The integrated thermal management module for the vehicle according to claim 9,
    wherein the valve is a three-way valve connected to the second reservoir portion, the chiller, and the first pump.

11. The integrated thermal management module for the vehicle according to claim 9,
    wherein the second reservoir portion has an inlet connected to a first radiator of the battery line, and has an outlet connected to the valve.

12. The integrated thermal management module for the vehicle according to claim 9,
    wherein the chiller is formed with a coolant inlet into which the coolant flows and a coolant outlet out which the coolant flows, the coolant inlet is connected to the battery core of the battery line, and the coolant outlet is connected to the valve.

13. The integrated thermal management module for the vehicle according to claim 8,
    wherein the chiller, the first reservoir portion, and the second reservoir portion are directly or indirectly connected to each other to be formed as a single assembly.

14. The integrated thermal management module for the vehicle according to claim 8,
    wherein the chiller is mounted adjacent to a side of the reservoir tank to be formed as a single assembly, and the assembly is fastened to a vehicle body through a damper.

* * * * *